United States Patent
Kerikorian et al.

(10) Patent No.: US 11,746,923 B2
(45) Date of Patent: Sep. 5, 2023

(54) MEMBRANE FOR A MOVING A VALVE DISK OF A CONTROL VALVE, AND A CONTROL VALVE

(71) Applicant: DELAVAL HOLDING AB, Tumba (SE)

(72) Inventors: Souren Kerikorian, Tumba (SE); Krister Lindström, Tumba (SE); Peter Rehnström, Tumba (SE)

(73) Assignee: DeLaval Holding AB, Tumba (SE)

( * ) Notice: Subject to any disclaimer, the term of this patent is extended or adjusted under 35 U.S.C. 154(b) by 37 days.

(21) Appl. No.: 17/609,692

(22) PCT Filed: May 5, 2020

(86) PCT No.: PCT/SE2020/050455
§ 371 (c)(1),
(2) Date: Nov. 8, 2021

(87) PCT Pub. No.: WO2020/226557
PCT Pub. Date: Nov. 12, 2020

(65) Prior Publication Data
US 2022/0221081 A1    Jul. 14, 2022

(30) Foreign Application Priority Data

May 9, 2019 (SE) .................. 1950553-6

(51) Int. Cl.
*F16K 11/044* (2006.01)
*F16K 31/40* (2006.01)
(Continued)

(52) U.S. Cl.
CPC ............. *F16K 31/402* (2013.01); *A01J 5/048* (2013.01); *F16K 11/044* (2013.01); *F16K 31/0606* (2013.01); *F16K 31/0627* (2013.01)

(58) Field of Classification Search
CPC .. F16K 11/044; F16K 31/066; F16K 31/0627; F16K 7/12; F16K 31/402; A01J 5/048
See application file for complete search history.

(56) References Cited

U.S. PATENT DOCUMENTS 2,243,344 A * 5/1941 Karst .................... F16K 11/044
137/869
2,920,655 A * 1/1960 Dwyer ...................... F16K 7/12
92/100
(Continued)

FOREIGN PATENT DOCUMENTS

AU 5218793 A 6/1994
CN 101548122 A 9/2009
(Continued)

OTHER PUBLICATIONS

Search Report for SE Patent Application No. 1950553-6 dated Jan. 1, 2019, 2 pages.
(Continued)

*Primary Examiner* — Umashankar Venkatesan
(74) *Attorney, Agent, or Firm* — Nixon & Vanderhye (57) ABSTRACT

A control valve and a membrane for a moving a valve disk of a control valve between a first position and a second position are provided. The membrane has a central axis perpendicular to an extension plane of the membrane. The membrane includes an outer annular rim portion, a central portion configured to be connected the valve disk, and a flexible portion that is annular and provided between the central portion and the outer annular rim portion. The membrane is flexible to permit the central portion to move back and forth along the central axis, thereby permitting the valve disk to move to one of the first position and the second position. The membrane is designed with an inherent pretensioning of the flexible portion, which permits the mem-
(Continued)

brane to exert a force on the valve disk from the first position towards the second position.

7 Claims, 5 Drawing Sheets

(51) Int. Cl.
*A01J 5/04* (2006.01)
*F16K 31/06* (2006.01)

(56) References Cited

U.S. PATENT DOCUMENTS

| | | | | |
|---|---|---|---|---|
| 3,083,943 | A * | 4/1963 | Stewart, Jr. | F16K 31/1266 |
| | | | | D23/233 |
| 3,257,097 | A * | 6/1966 | Boteler | F16K 7/123 |
| | | | | 251/331 |
| 4,182,366 | A * | 1/1980 | Boehringer | F16K 31/1262 |
| | | | | 128/205.24 |
| 4,887,516 | A | 12/1989 | Scott et al. | |
| 5,177,579 | A * | 1/1993 | Jerman | G01L 9/0073 |
| | | | | 257/419 |
| 5,199,685 | A * | 4/1993 | Larseneur | F16K 7/12 |
| | | | | 251/294 |
| 6,058,970 | A * | 5/2000 | Osaki | F16K 7/17 |
| | | | | 137/59 |
| 6,067,893 | A | 5/2000 | Drahusz | |
| 7,634,962 | B2 * | 12/2009 | Muller | F16K 7/12 |
| | | | | 92/99 |
| 10,420,294 | B2 * | 9/2019 | Socolsky | F16K 21/04 |
| 10,598,194 | B2 * | 3/2020 | Gunell | F16K 11/048 |
| 10,711,906 | B2 * | 7/2020 | Yamagata | H01M 8/04201 |
| 10,857,777 | B2 * | 12/2020 | Durant | F16K 31/126 |
| 11,137,079 | B2 * | 10/2021 | Williams | F16K 7/17 |
| 11,137,080 | B2 * | 10/2021 | Williams | F16K 27/0236 |
| 2003/0230191 | A1 * | 12/2003 | Ohrle | F04B 43/0054 |
| | | | | 92/98 R |
| 2005/0205815 | A1 * | 9/2005 | Frenkel | F16K 7/126 |
| | | | | 251/61.1 |
| 2006/0130912 | A1 * | 6/2006 | Lodolo | F16K 11/048 |
| | | | | 137/625.27 |
| 2013/0119289 | A1 | 5/2013 | Morris et al. | |
| 2014/0264103 | A1 | 9/2014 | Pressley et al. | |
| 2014/0295310 | A1 | 10/2014 | Yamagata et al. | |
| 2015/0108386 | A1 | 4/2015 | Obara et al. | |
| 2017/0000075 | A1 | 1/2017 | Johansson | |

FOREIGN PATENT DOCUMENTS

| | | |
|---|---|---|
| CN | 105650317 A | 6/2016 |
| CN | 205991196 U | 3/2017 |
| EP | 1 484 540 | 12/2004 |
| JP | 2003-247650 A | 9/2003 |
| WO | 93/16309 | 8/1993 |
| WO | 95/14874 | 6/1995 |

OTHER PUBLICATIONS

International Search Report for PCT/SE2020/050455 dated Jul. 9, 2020, 2 pages.
Written Opinion of the ISA for PCT/SE2020/050455 dated Jul. 9, 2020, 7 pages.
Communication pursuant to Article 94(3) EPC issued in European Patent Application No. 20 724 962.4 dated Nov. 4, 2022.
Office Action issued in Chinese Patent Application No. 202080034296.2 dated Apr. 12, 2023.

* cited by examiner

MEMBRANE FOR A MOVING A VALVE DISK OF A CONTROL VALVE, AND A CONTROL VALVE

This application is the U.S. national phase of International Application No. PCT/SE2020/050455 filed May 5, 2020 which designated the U.S. and claims priority to SE Patent Application No. 1950553-6 filed May 9, 2019, the entire contents of each of which are hereby incorporated by reference.

TECHNICAL FIELD OF THE INVENTION

The present invention refers to a membrane for moving a valve disk of a control valve between a first position and a second position. The present invention also refers to a control valve.

BACKGROUND AND PRIOR ART

In larger milking installations, a problem to build up the milking vacuum quickly enough at startup of the milking installation may occur. The problem is related to the functioning of the membrane of the control valve that controls the shut off valve provided on the respective long milk conduit to the milking cluster. In order to build up the milking vacuum efficiently, after a shutdown of the milking installation, it is important that each shut off valve is properly closed to prevent ambient air from leaking into milking vacuum system. Thus the control valves have to be activated to control the respective shut off valve to be closed so that no air may leak into the milking vacuum system during building up of the vacuum.

Occasionally, the membrane of the control valve may not be able to lift the valve disk from a valve disk seat in one of its positions, in particular its first position in which vacuum, or low pressure, is allowed to pass through the outlet of the control valve. The valve disk may be attached to the valve disk seat in its first position in the control valve. In order to solve this problem, a solution with a coil spring mounted underneath the membrane has been tested. According to this solution, the valve disk is subjected to a force from the coil spring and biased away from the valve disk seat and the first position towards a second position. The idea is that the coil spring may assist the membrane in pulling the valve member away from the first position. However, the functionality of this solution is not perfect. Moreover, the solution is associated with increased service costs.

SUMMARY OF THE INVENTION

The purpose of the present invention is to overcome the problems discussed above. In particular, the purpose is to overcome the problem of the valve disk being attached in one of its positions.

The purpose is achieved by the membrane initially defined, which is characterized in that the membrane is designed with an inherent pre-tensioning of the flexible portion, which permits the flexible portion to exert a force on the valve disk from the first position towards the second position.

The inherent pre-tensioning of the membrane may assist a relatively high pressure or a relatively low pressure to move the valve disk away from the first position and towards the second position. The membrane may thus overcome the problem of the prior art that the valve disk get clogged or attached to the valve disk seat of the first position. Moving the valve disk from the second position to the first position may be less critical. Atmospheric pressure may, when applied, overcome the inherent pre-tensioning of the membrane to move the valve disk to the first position.

According to an embodiment of the invention, the flexible portion has a wavy shape, in particular in a cross-section, with a circular wave peak and a circular wave valley. Such a wavy shape may create the inherent pre-tensioning of the flexible portion to exert a pulling force on the central portion in a desired direction along the central axis, i.e. in particular from the first position. The cross-section may be parallel with the central axis.

According to an embodiment of the invention, the wave peak is located more closely to the central axis than the wave valley. The inner wave peak and the central portion may thus be lifted in relation the outer wave valley and the central portion.

According to an embodiment of the invention, the flexible portion comprises an intermediate annular flank extending between and connecting wave peak and the wave valley. The intermediate annular flank may slope from the wave peak to the wave valley.

According to an embodiment of the invention, the flexible portion has a thickness, wherein the thickness is thinner through the intermediate annular flank than through the wave peak and the wave valley. Such a thinner intermediate annular flank may improve the flexibility of the flexible portion.

According to an embodiment of the invention, the membrane has an active side and a passive side, wherein the outer annular rim portion has annular surface on the active side, wherein the wave peak is located above the annular surface in a rest position of the membrane.

According to an embodiment of the invention, the wave valley is located below the annular surface in the rest position.

The purpose is also achieved by the control valve initially defined, which is characterized in that the membrane is designed with an inherent pre-tensioning of the flexible portion, which permits the membrane to exert a force on the valve disk from the first position towards the second position. The inherent pre-tensioning of the membrane of the control valve may assist a relatively high pressure or a relatively low pressure to move the valve disk away from the first position and towards the second position, and thus prevent the valve disk from resting attached to the valve disk seat in the first position.

Various embodiments of the control valve are defined in the dependent claims 9 to 16. For instance, the central portion of the membrane may be connected to the valve disk via a rod member extending through and attached to a central hole of the central portion.

BRIEF DESCRIPTION OF THE DRAWINGS

The present invention is now to be explained more closely through a description of an embodiment and with reference to the drawings attached hereto.

DETAILED DESCRIPTION OF AN EMBODIMENT OF THE INVENTION

Figure 1:
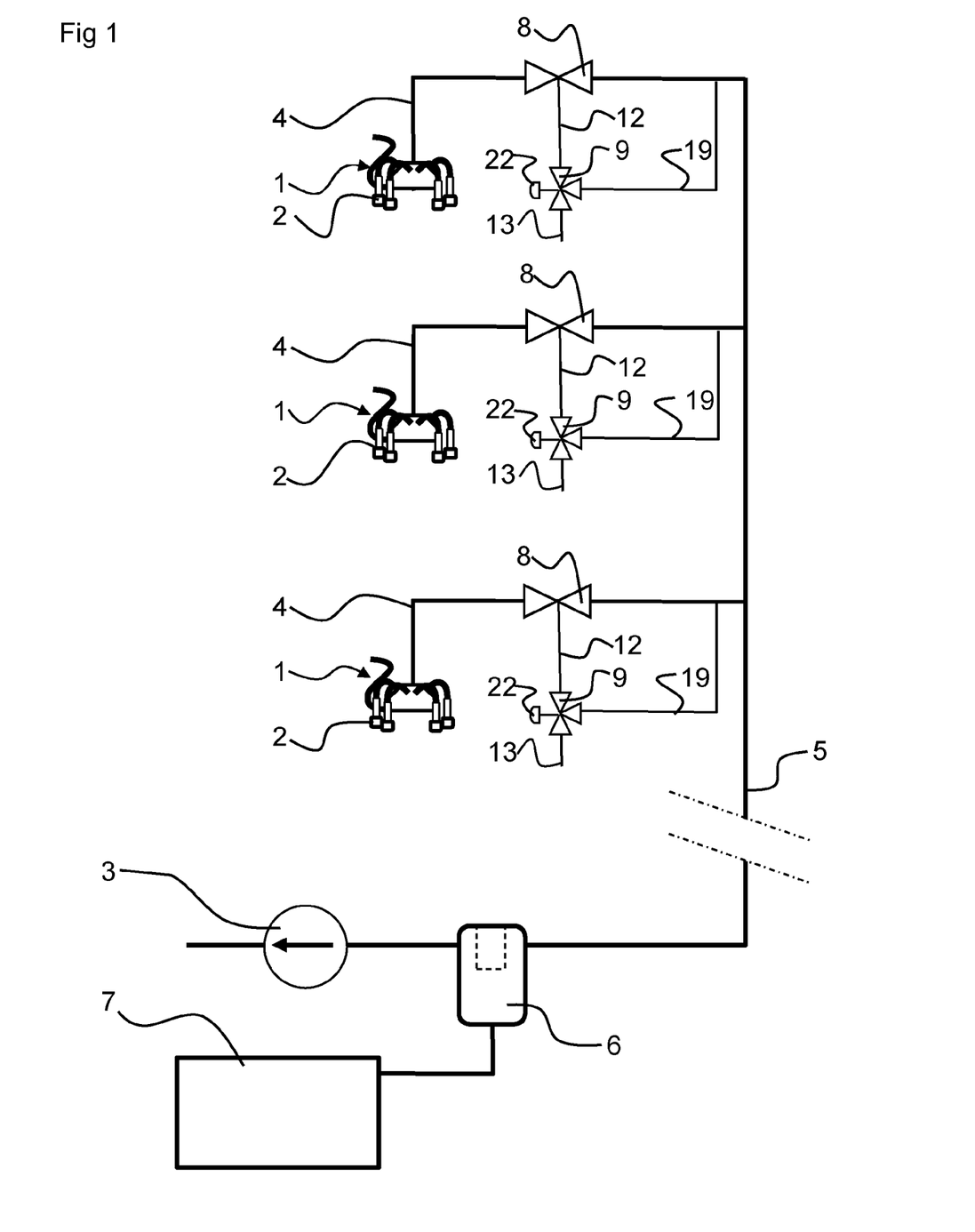
FIG. 1 is a schematic illustration of a milking installation comprising a plurality of milking clusters.

FIG. 1 discloses a milking installation comprising a plurality of milking places, wherein each milking place comprises a milking cluster 1 having a number of teatcups 2 to be attached to the teats of an animal to be milked at the milking place.

Each milking cluster 1 may be connected to a vacuum pump device 3 via a respective long milk conduit 4, a common vacuum conduit 5 and a milk receiver 6. During milking, milk may thus be conveyed from the animals through the respective milking cluster 1, the respective long milk conduit 4 and the common milk conduit 5 to the milk receiver 6 by means of the vacuum or low pressure provided by the vacuum pump device 3. The milk collected in the milk receiver 6 may be conveyed to a milk tank 7 for delivery to a dairy.

A respective shut off valve 8 is provided on each long milk conduit 4. The shut off valve 8 is configured to close or open the respective long milk conduit 4 for the low pressure to the respective milking cluster 1.

Figure 2:
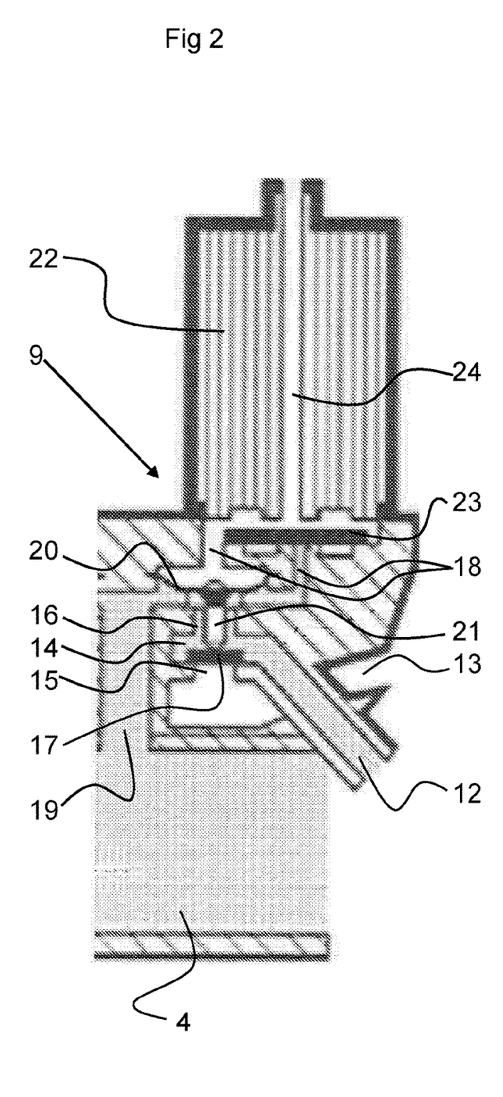
FIG. 2 is a schematic cross-sectional view of a control valve of the milking installation in FIG. 1.
Figure 3:
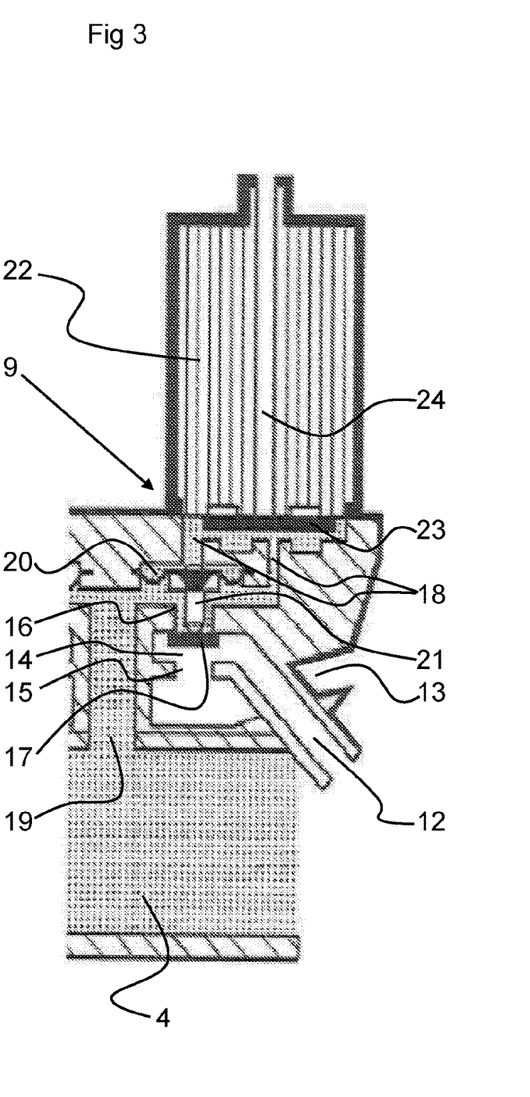
FIG. 3 is a schematic cross-sectional view of the control valve in FIG. 2.
Figure 4:
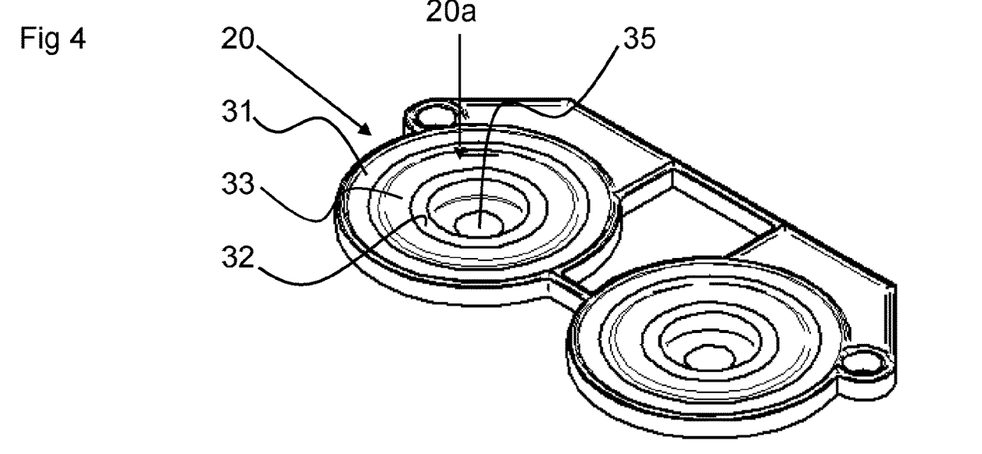
FIG. 4 is a schematic perspective view of a membrane of the control valve in FIGS. 2 and 3.
Figure 5:
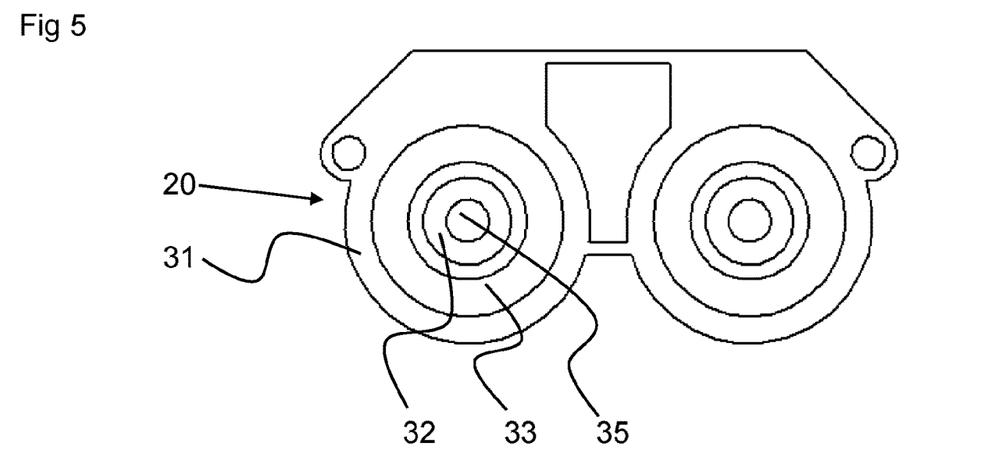
FIG. 5 is a schematic view from above of the membrane in FIG. 4.

The closing and opening of the shut off valve 8 is controlled by means of a control valve 9, see also FIGS. 2 and 3.

The control valve 9 has an outlet 12. The outlet 12 is connected to the shut off valve 8 as can be seen in FIG. 1. The control valve 9 is configured to connect the outlet 12, and thus the shut off valve 8, to a low pressure source, formed by the vacuum pump device 3, or to a high pressure source, formed by the atmosphere, via a high pressure inlet 13.

The control valve 9 comprises an outlet chamber 14, which is connected to the outlet 12. The outlet chamber 14 comprises high pressure port 15 and a low pressure port 16. A valve disk 17 is provided in the outlet chamber 14 and is movable between a first position closing the high pressure port 15, see FIG. 2, and a second position closing the low pressure port 16, see FIG. 3.

The control valve 9 also comprises a pilot circuit 18. The pilot circuit 18 is connectable to the low pressure source or the high pressure source. In the embodiment disclosed, the pilot circuit 18 is connectable to the low pressure source, i.e. the vacuum pump device 3, via the common vacuum conduit 5, the long milk conduit 4 and a low pressure inlet 19. The pilot circuit 18 may alternatively be directly connected to the vacuum pump device 3 via the low pressure inlet 19.

The pilot circuit 18 acts on a membrane 20, which may have an active side 20a and a passive side 20b, see also FIGS. 4-7. The passive side 20b is turned towards the valve disk 17. The membrane 20 acts mechanically on the valve disk 17. In the embodiment disclosed, the membrane 20 is connected to the valve disk 17 by a rod member 21 that may extend through the low pressure port 16.

An actuator 22 is comprised by the control valve 9 and is configured to connect the pilot circuit 18 to one of the low pressure source 3 and the high pressure source. The actuator 22 may comprise a solenoid which acts on a magnetic disk 23 arranged in the pilot circuit 18.

The pilot circuit 18 extends between the active side 20a of the membrane 20 and the passive side 20b of the membrane 20. In FIG. 3, the pilot circuit is open from the active side 20a of the membrane to the passive side 20b of the membrane. In FIG. 2, the magnetic disk 23 shuts off the pilot circuit 18.

The actuator 22 comprises a channel 24, which may be provided to extend centrally through the solenoid of the actuator 22, as is illustrated in FIGS. 2 and 3. In the embodiment disclosed, the channel 24 extends between the surrounding atmosphere and the pilot circuit 18. The pilot circuit 18 is thus connectable to the high pressure source, i.e. the atmosphere, via the channel 24.

The membrane 20 is configured to move the valve disk 17 to the first position when the pilot circuit 18 is connected to the high pressure source, i.e. to the atmosphere via the channel 24, and to move the valve disk 17 to the second position when the pilot circuit 18 is connect to the low pressure source, i.e. to the vacuum pump device 3 via the low pressure inlet 19.

In FIG. 2, the valve disk 17 is in the first position closing the high pressure port 15. In the embodiment disclose, the actuator 22 is not activated, i.e. no electric current is fed to the solenoid thereof, so that the magnetic disk 23 may be moved away, for instance by the gravity force, from the solenoid to a primary position preventing the low pressure from passing through the pilot circuit 18 to the active side 20a of the membrane 20. Atmospheric pressure may act on the active side 20a of the membrane 20 forcing the membrane 20 downwards which means that the membrane 20 forces the rod member 21 downwards so that the rod member 21 forces the valve disk 17 to the first position against the high pressure port 15.

A low pressure may thus in the first position be guided through the control valve 9 via the low pressure inlet 19, the low pressure port 16, the outlet chamber 14 and out through the outlet 12 to the shut off valve 8, which in response to the low pressure may open the long milk conduit 4 to permit low pressure, i.e. the milking vacuum, to act on the milking cluster 1 and the teatcups 2.

In FIG. 3, the valve disk 17 is in the second position closing the low pressure port 16. In the embodiment disclosed, the actuator 22 is activated, i.e. electric current is fed to the solenoid thereof, so that the magnetic disk 23 may be pulled to the solenoid to a secondary position closing the channel 24 and preventing the high pressure from passing through the pilot circuit 18 to the active side 20a of the membrane 20. Instead the low pressure may act on the active side 20a of the membrane 20 pulling the membrane 20 upwards, which means that the membrane 20 pulls the rod member 21 upwards so that the rod member 21 pulls the valve disk 17 to the second position against the low pressure port 16.

A high pressure may thus in the second position be guided through the control valve 9 via the high inlet 13, the high pressure port 15, the outlet chamber 14 and out through the outlet 12 to the shut off valve 8, which in response to the high pressure may close the long milk conduit 4 to prevent the low pressure, i.e. the milking vacuum, from acting on the milking cluster 1 and the teatcups 2.

The membrane 20 of the embodiment disclosed will now be further described with reference to FIGS. 4-8. It should be noted that FIGS. 4-6 discloses a membrane member having two membranes 20. The control valves 9 may be arranged side by side in a pair, wherein the membranes 20 advantageously may be manufactured with two membranes 20 as disclosed in FIGS. 4-6. However, for one control valve 9 only one, see FIG. 7, of the membranes 20 disclosed in FIGS. 4-6 may be used.

The membrane 20 extends along an extension plane p. A central axis x of the membrane 20 is perpendicular to the extension plane p. The membrane 20 comprises an outer annular rim portion 31, a central portion 32 and flexible portion 33.

The outer annular rim portion 31 may have an annular surface 34 located on the active side 20a of the membrane 20. The annular surface 34 may be parallel with the extension plane p. The central portion 32 may be circular and is configured to be connected the valve disk 17. The flexible portion 33 is annular and provided between the central portion 32 and the outer annular rim portion 31. The flexible portion 33 may adjoin and connect to the outer annular rim portion 31 and the central portion 32.

The central portion 32 has a central hole 35. The rod member 21 may extend through and be attached to the central hole 35 of the central portion 32.

The membrane 20 is flexible to permit the central portion 32 to move back and forth along the central axis x, thereby permitting the valve disk 17 to move to one of the first position and the second position.

As initially mentioned, the membrane 20 may not always be able to lift the valve disk 17 from its first position in which the low pressure is allowed to pass through the outlet 12. In order to overcome this problem, the membrane 20 is designed with an inherent pre-tensioning of the flexible portion 33, which permits the membrane 20 to exert a force on the valve disk 17 from the first position towards the second position. The movement of the valve disk 17 from the first position shown in FIG. 2 may thus be facilitated by the inherent pre-tensioning of the flexible portion 33. It should be noted that the inherent pre-tensioning may not prevent the movement of the valve disk 17 from the second position when the high pressure acts on the active side 20a of the membrane 20 via the channel 24.

Figure 7:
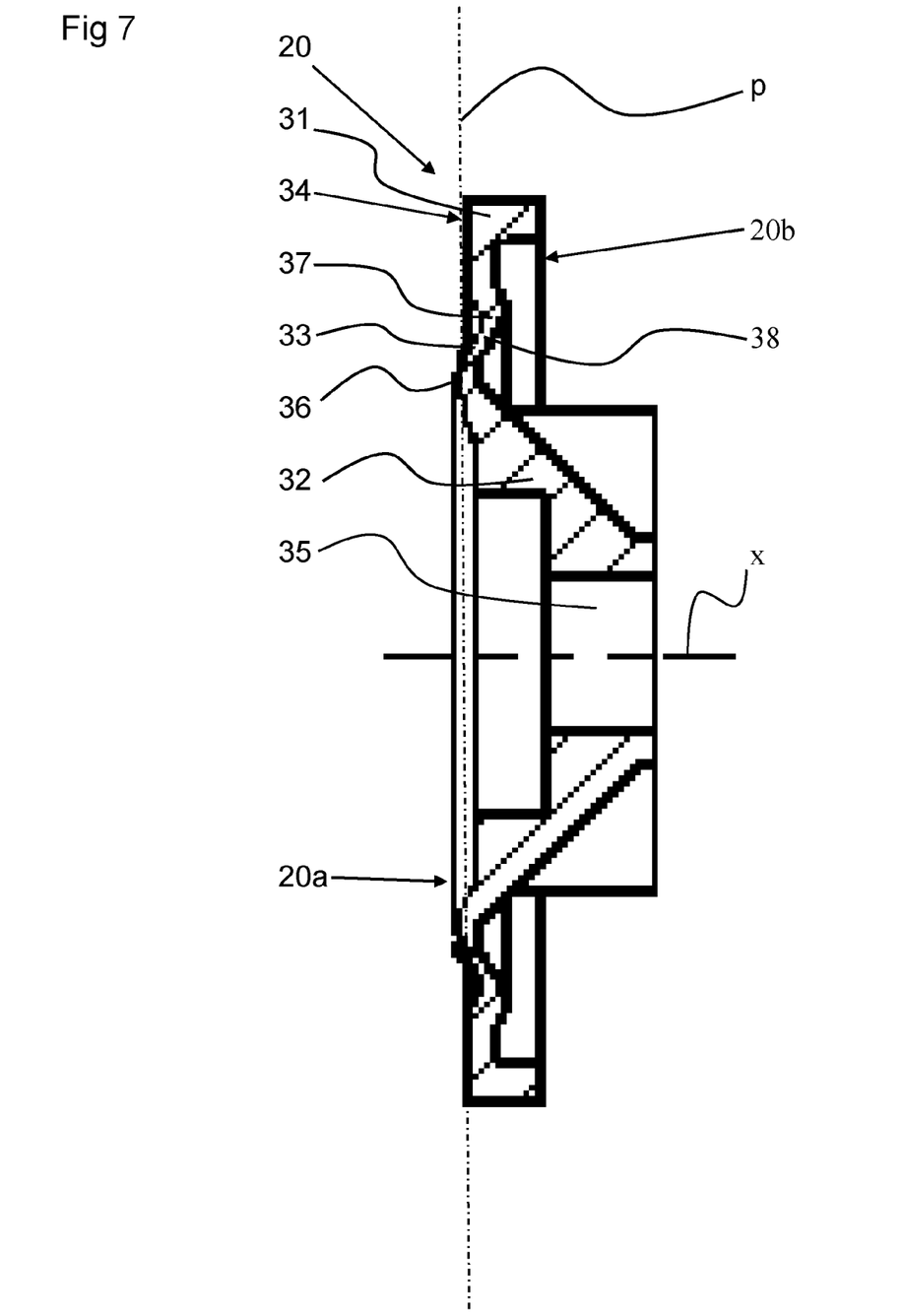
FIG. 7 is a schematic cross-sectional view of the membrane along the line VII-VII in FIG. 5.
Figure 8:
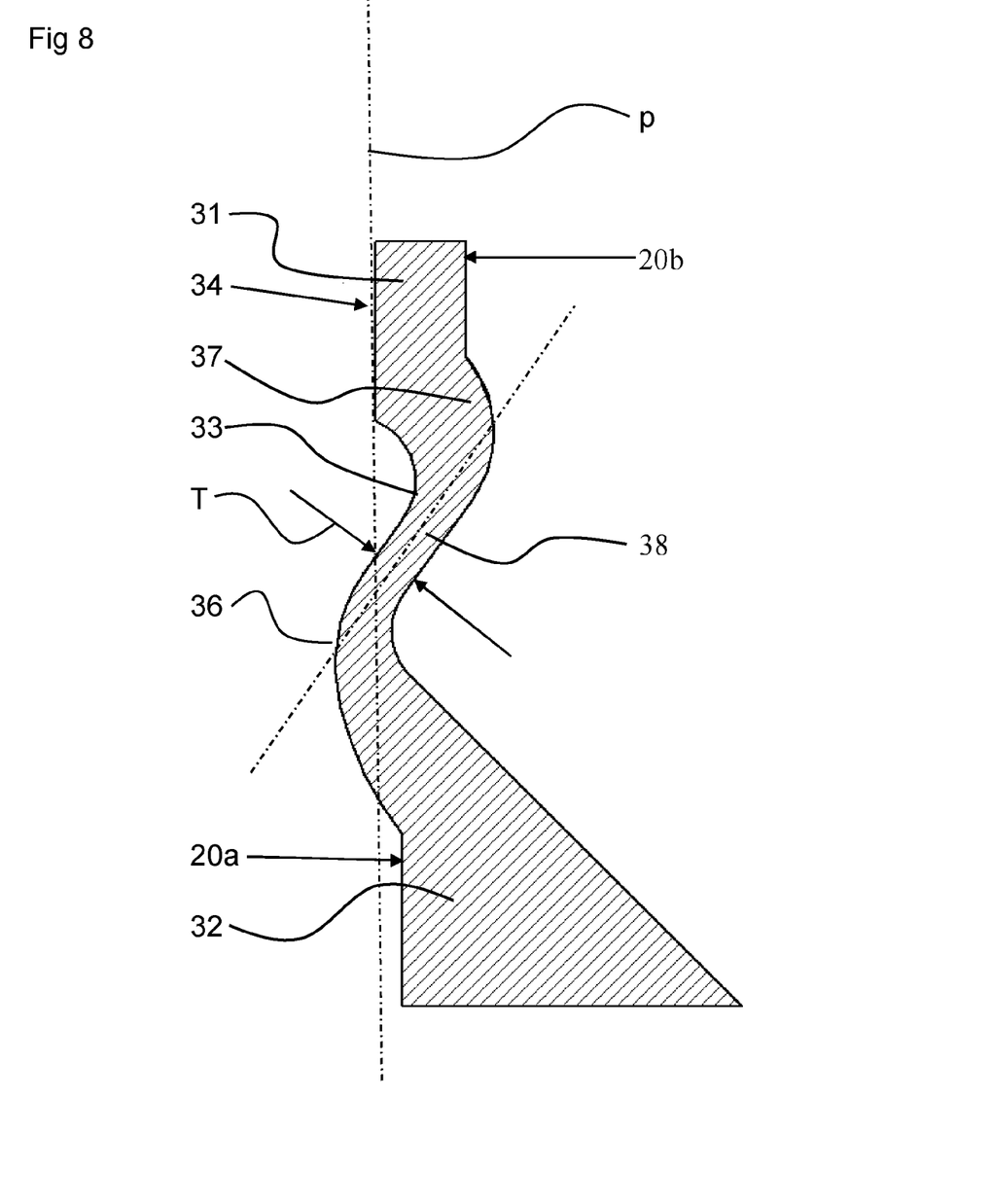
FIG. 8 is a schematic cross-sectional view of a part of the membrane in FIG. 7.

As can be seen in particular in FIGS. 7 and 8, the flexible portion 33 may have a wavy shape, in a cross-section comprising the central axis x, with a circular wave peak 36 and a circular wave valley 37. The wave peak 36 may be located more closely to the central axis x than the wave valley 37.

The flexible portion 33 comprises an intermediate annular flank 38 extending between and connecting wave peak 36 and the wave valley 37. The intermediate annular flank 38 may slope from the wave peak 36 to the wave valley 37. As can be seen in FIG. 8, the intermediate annular flank 38 may slope outwardly and downwardly in relation to the extension plane p, and thus form an angle of inclination with extension plane p.

The flexible portion 33 has a thickness T. The thickness T may be thinner through the intermediate annular flank 38 than through the wave peak 36 and through the wave valley 37.

The wave peak 36 may be located above the annular surface 34 in a rest position of the membrane 20, and the wave valley 37 may be located below the annular surface 34 in the rest position.

Figure 6:
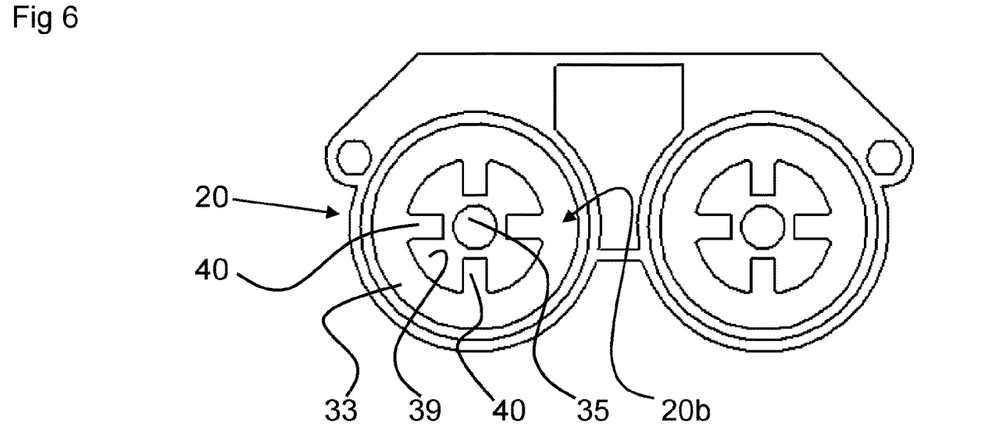
FIG. 6 is a schematic view from below of the membrane in FIG. 4.

FIG. 6 discloses the passive side 20b of the membrane 20. The central portion 32 comprises a bottom surface 39 on the passive side 20b. The bottom surface 39 may surround the central hole 35 and may be parallel with the extension plane p. The central portion 32 may comprise four grooves 40 extending through the bottom surface 39 and being arranged perpendicularly in relation to each other. The purpose of the grooves 40 is to permit the low pressure to pass through the low pressure port 16 in the first position of the valve disk 17, see FIG. 2.

The membrane 20 may be manufactured of a plastic elastic material, for instance silicon rubber. The bending rigidity of the material of the membrane 20 may be at least 45 Shore, preferably at least 50 Shore.

The present invention is not limited to the embodiments disclosed but may be varied and modified within the scope of the following claims.

The invention claimed is:

1. A membrane configured to move a valve disk of a control valve between a first position and a second position, the membrane comprising:
    an outer annular rim portion having an annular surface on an active side thereof;
    a central portion configured to be connected to the valve disk; and
    a flexible portion that is annular and provided between the central portion and the outer annular rim portion, the flexible portion having a wavy shape with a circular wave peak and a circular wave valley, the circular wave peak being located more closely to a central axis of the membrane than the circular wave valley, the circular wave peak being located above the annular surface of the outer annular rim portion in a rest position of the membrane, the wavy shape of the flexible portion creating a pre-tensioning of the flexible portion such that the membrane is configured to exert a force on the valve disk from the first position toward the second position when the membrane is assembled in the control valve,
    wherein the membrane extends along an extension plane, the central axis of the membrane being perpendicular to the extension plane,
    wherein the membrane is flexible to permit the central portion to move back and forth along the central axis, thereby permitting the valve disk to move to one of the first position and the second position,
    wherein the flexible portion comprises an intermediate annular flank extending between and connecting the circular wave peak and the circular wave valley, and
    wherein the flexible portion has a thickness that is thinner through the intermediate annular flank than through the circular wave peak and the circular wave valley.

2. The membrane according to claim 1, wherein the circular wave valley is located below the annular surface in the rest position.

3. A control valve, comprising:
    an outlet configured to connect the outlet to a low pressure source or to a high pressure source;
    an outlet chamber connected to the outlet;
    a high pressure port to the outlet chamber;
    a low pressure port to the outlet chamber;
    a valve disk movable between a first position closing the high pressure port and a second position closing the low pressure port;
    a pilot circuit that acts on a membrane acting mechanically on the valve disk via a flexible portion of the membrane, the membrane being configured to move the valve disk to the first position when the pilot circuit is connected to the high pressure source and to move the valve disk to the second position when the pilot circuit is connected to the low pressure source; and
    an actuator configured to connect the pilot circuit to one of the low pressure source and the high pressure source, wherein the membrane extends along an extension plane, a central axis of the membrane being perpendicular to the extension plane, wherein the membrane comprises an outer annular rim portion having an annular surface on an active side thereof, a central portion configured to be connected to the valve disk, and a flexible portion that is annular and provided between the central portion and the outer annular rim portion, the flexible portion having a wavy shape with a circular wave peak and a circular wave valley, the circular wave peak being located more closely to the central axis of the membrane than the circular wave valley, the circular wave peak being located above the annular surface of the outer annular rim portion in a rest position of the membrane, the wavy shape of the flexible portion creating a pre-tensioning of the flexible portion such that the membrane is configured to exert a force on the valve disk from the first position toward the second position when the membrane is assembled in the control valve, and wherein the membrane is flexible to permit the central portion to move back and forth along the central axis, thereby permitting the valve disk to move to one of the first position and the second position.

4. The control valve according to claim 3, wherein the flexible portion comprises an intermediate annular flank extending between and connecting the circular wave peak and the circular wave valley.

5. The control valve according to claim 4, wherein the flexible portion has a thickness that is thinner through the intermediate annular flank than through the circular wave peak and the circular wave valley.

6. The control valve according to claim 3, wherein the circular wave valley is located below the annular surface in the rest position.

7. The control valve according to claim 3, wherein the central portion is connected to the valve disk via a rod member extending through and attached to a central hole of the central portion.

* * * * *